Sept. 10, 1929.  H. F. FREASE  1,728,050
TRANSMISSION LINE TOWER
Filed June 11, 1928

Inventor
H. F. Frease
By Harry Frease
Attorney

Patented Sept. 10, 1929.

1,728,050

UNITED STATES PATENT OFFICE.

HURXTHAL F. FREASE, OF CANTON, OHIO.

TRANSMISSION-LINE TOWER.

Application filed June 11, 1928. Serial No. 284,537.

My invention relates to transmission line towers including cross arms upon the outer ends of which cable conductors are suspended upon insulators or the like.

As usually constructed torsion loads are applied by the conductors through the cross arms to the main tower structure, when the conductors sway in the wind, or when one or more conductors break.

The objects of the present improvements include the provision of transmission line towers in which no torsion loads are transmitted to the main tower structure; and further objects of the improvements include the provision of such towers in which the torsion couples applied by the conductors are absorbed.

These objects are attained by a construction and arrangement hereinafter set forth in detail, and claimed, and which may be stated in general terms as including preferably a separate cross arm for each conductor to be supported, each cross arm being hingedly connected at its inner end with the transmission line tower, and means associated with the cross arms, for absorbing torsion couples applied on the cross arms, by applying forces resisting rotation of the cross arms during rotation thereof.

Figure 2:
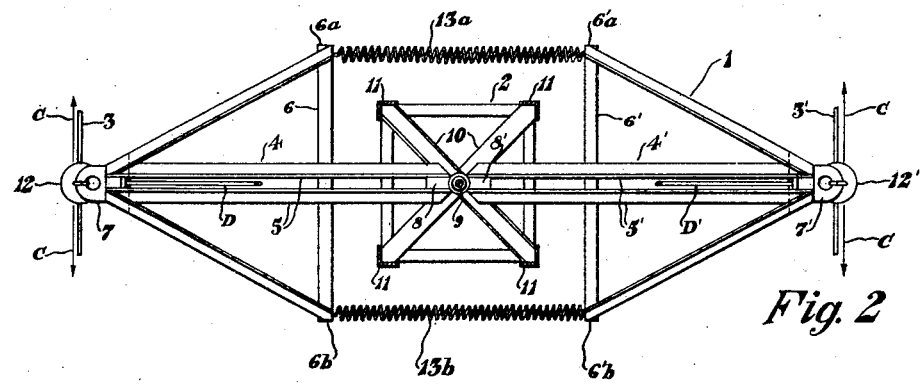
Figure 1:
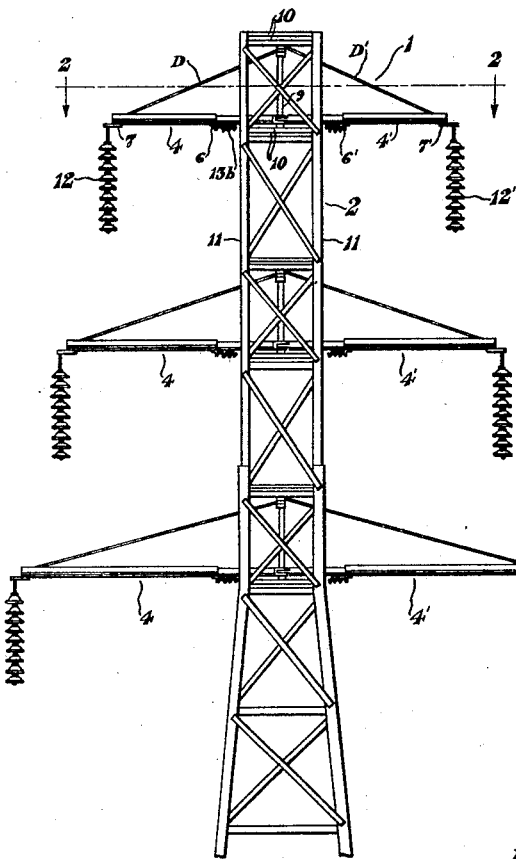

A preferred embodiment of the present improvements including one type of means for absorbing torsion couples, is illustrated in the accompanying drawings forming part hereof, in which Figure 1 is a fragmentary elevation view of a transmission line tower including the improvements hereof; and Fig. 2, an enlarged sectional view thereof as on line 2—2, Fig. 1.

Similar numerals refer to similar parts throughout the drawings.

The improved transmission line tower indicated generally at 1 includes a main tower structure indicated generally at 2, carrying at its upper end, for each set of laterally spaced conductors 3 and 3' to be supported, a set of separate cross arm structures 4 and 4', which may be made up of cross arm angle bars 5 and 5', respectively, secured at right angles to parallel line bars 6 and 6', respectively, and at their outer ends to insulator suspending members 7 and 7', respectively, and at their inner ends 8 and 8', respectively, being pivotally mounted on the main tower structure 2 as at the lower end of a vertically extending axle 9 secured at its outer ends to diagonal members 10 which are secured at their outer ends to the corner posts 11, of the main tower structure 2. Diagonal members D and D' may connect the upper end of each axle 9 with the outer ends of the angle bars 5 and 5', respectively.

An insulator 12 is suspended from each of the members 7, and an insulator 12' is suspended from each of the members 7', and the insulators 12 each have suspended thereon one of the conductors 3 extending at each side of the cross arm structure 4, and the insulators 12' each have suspended thereon one of the conductors 3' extending at each side of the cross arm structure 4'.

When all the conductors are intact and in equilibrium, the arrows C indicate the direction and magnitude of the parallel line loads.

If the conductors are swayed by the wind or one of the conductors is broken, the magnitude of the parallel line load is immediately changed, whereby torsion couples are applied to the cross arms, but not to the main tower structure because of the pivotal connection of the cross arm to the structure.

Means are associated with the cross arm structures 4 and 4', for absorbing these torsion couples, by applying forces resisting rotation of the cross arms during rotation thereof, and may include a spring $13^a$ of suitable capacity connecting the ends $6^a$ of the parallel line bar 6, with the end $6'^a$ of the parallel line bar 6', and a spring $13^b$ connecting the end $6^b$ of the parallel line bar with the end $6'^b$ of the parallel line bar 6'.

Accordingly, it is obvious that the springs $13^a$ and $13^b$ will absorb the torsion couples caused by the swaying of the conductors or the breaking of one of them, and that the tower structure will receive only direct loads to the pivotal mounting of the cross arm structures thereon. Each spring applies a force resisting rotation of one of the cross arms during rotation thereof.

It is obvious that other mechanical expedients may be used to take the place of the springs in absorbing the torsion couples.

I claim:

1. A transmission line tower including a main tower structure, a pair of oppositely extending cross arm structures, each pivotally connected at its inner end upon the tower structure, and each adapted for supporting a transmission line conductor at its outer end, and means connecting the oppositely extending cross arm structures for absorbing an unbalanced force applied upon each cross arm structure.

2. A transmission line tower including a main tower structure, a pair of oppositely extending cross arm structures, each pivotally connected at its inner end upon the tower structure, and each adapted for supporting a transmission line conductor at its outer end, and means for absorbing an unbalanced force applied upon each cross arm structure including a member secured upon each cross arm structure and extending angularly to the line between the pivotal connection and the conductor support, and a spring connecting each end of each angularly extending member with an end of the other angularly extending member.

3. A transmission line tower including a main tower structure, a cross arm structure pivotally connected at its inner end upon the tower structure and adapted for supporting a transmission line conductor at its outer end, and means for applying a force resisting rotation of the cross arm during rotation thereof.

In testimony that I claim the above, I have hereunto subscribed my name.

HURXTHAL F. FREASE.